United States Patent Office 3,156,278
Patented Nov. 10, 1964

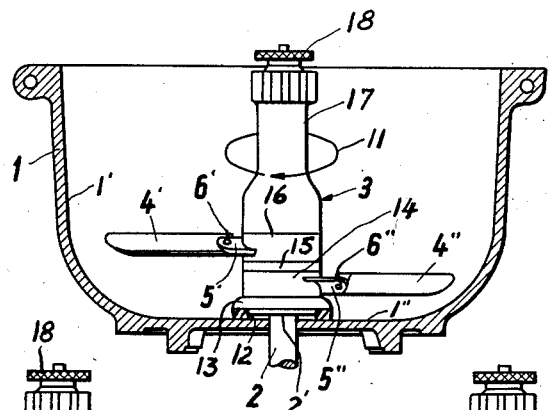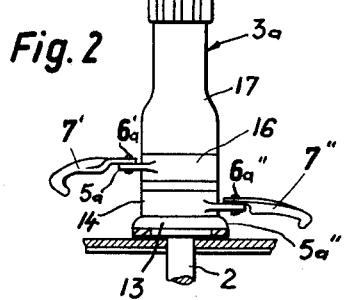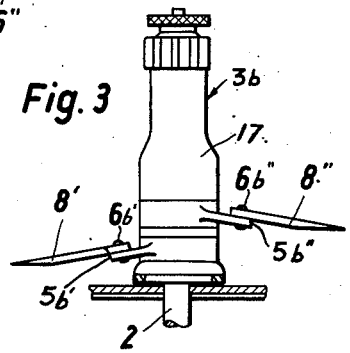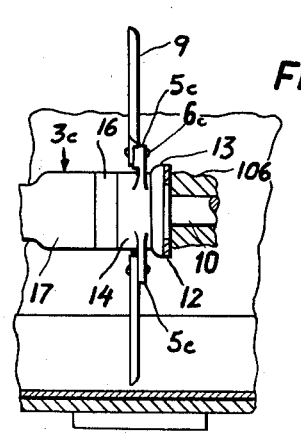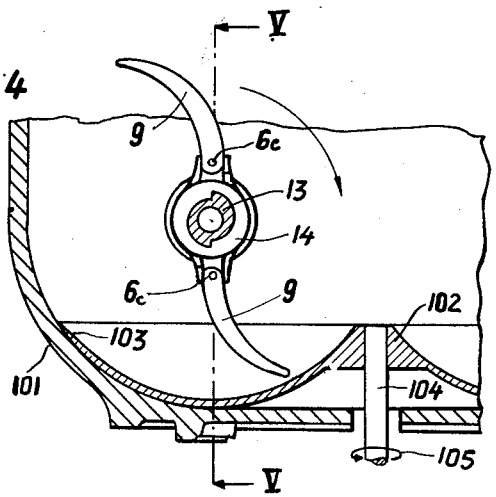

3,156,278
BLENDER
Fritz Otto, Hameln (Weser), Germany, assignor, by mesne assignments, to Belder Trust, Vaduz, Liechtenstein
Filed Dec. 27, 1962, Ser. No. 247,596
Claims priority, application Germany, Dec. 28, 1961, St 18,714
13 Claims. (Cl. 146—67)

My present invention relates to a blender, i.e. a device used in the comminution and/or intimate mixing of foodstuffs and other materials.

Conventional blenders are provided with one or more cutting and/or mixing blades (usually two) which orbit on a rapidly rotating shaft to sweep a region close to the side and/or bottom walls of the blender receptacle. The material to be processed opposes the rotation of the blades to a varying extent, depending upon its own viscosity which in turn may vary during operation. A high resistance encountered by the blades tends to overload the associated drive motor, thus reducing the efficiency of the device, and may also lead to objectionable heating of the rotary assembly and the goods to be processed.

It is, therefore, the general object of my present invention to provide an improved rotary unit for such blender whose blade or blades will automatically adjust themselves to different degrees of resistance from the surrounding mass and will, depending upon that resistance, sweep orbits of greater or lesser radii so as to maintain optimum load conditions with avoidance of the difficulties stated above.

An ancillary object of the invention is to provide a mounting for the rotary blades of blenders enabling these blades to yield rather than break, if accidentally, the material to be processed should contain lumps or foreign bodies of great hardness.

I realize the foregoing objects by pivotably mounting each blade of the rotary blender assembly on a hub of a driven shaft in such manner that its pivotal axis is offset from the axis of rotation, i.e. the shaft axis. Thus, the blade is swingable about its pivotal axis so as to sweep an orbit of maximum radius in a fully extended position, under the urging of the centrifugal force and in the absence of major ambient resistance, and will be progressively retracted into orbits of ever smaller radii as the ambient resistance increases. The term "fully extended position" denotes the farthest position to which the blade can swing out, it being understood that this position may be determined, if desired, by stops limiting the swing.

My improved blender will be equally useful for the chopping of fibrous materials which, as the comminution proceeds, offer less and less resistance to the rotary blades so that their sweep radius approaches its maximum, and for the stirring of progressively thickening slurries which cause the orbital radius to diminish.

Representative embodiments of my invention will be described in detail hereinafter with reference to the accompanying drawing in which:

FIG. 1 is an axial cross-sectional view of a blender incorporating my improved blade assembly;

FIGS. 2 and 3 show, in elevation, modifications of the blade assembly illustrated in FIG. 1;

FIG. 4 is a fragmentary axial cross-sectional view of a different type of blender to which the invention is applicable; and FIG. 5 is a fragmentary sectional view taken on the line V—V of FIG. 4.

The blender shown in FIG. 1 comprises a generally cup-shaped receptacle 1 with a peripheral wall 1' and a bottom wall 1". A vertical shaft 2, connectable to a driving motor (not shown) for rapid rotation as indicated by arrow 11, traverses the receptacle bottom and carries a hub assembly 3 which includes a sealing ring 12, a stepped bushing 13 press-fitted onto the shaft 2 and resting against a shoulder 2' thereof, this bushing being formed with a noncircular profile (see FIG. 4), a set of rings 14, 15, 16 matingly surrounding the bushing 13, a tubular spacer 17, and a knurled nut 18 embracing the threaded upper end of the shaft to clamp the assembly 3 together. This assembly is generally similar to the one disclosed in my copending application Ser. No. 199,935, filed June 4, 1962, except that the blades 4', 4" associated therewith are not mounted directly on the shaft 2 but are freely swingable about pins 6', 6" whose pivotal axes are offset from the shaft axis. These pins are carried by lugs 5', 5", respectively integral with the rings 14, 16, which are inclined to the horizontal and, therefore, to their own orbital planes so that the pivotal axes of the blades 4', 4" include a small angle with the vertical whereby the leading edges of the blades are elevated above their trailing edges. It will be noted that the tips of the blades, in their fully extended positions illustrated, sweep close to the peripheral wall 1' but are retractable therefrom, against the centrifugal force, by a swing about their pivots 6', 6" in a sense opposite the rotation of shaft 2.

In FIG. 2 I have shown a substantially identical hub assembly 3a wherein, however, the lugs 5a', 5a" are horizontally disposed so that the pivotal axes of pins 6a', 6a" are parallel to the shaft axis. The blades 7', 7" fulcrumed on these pins are, however, twisted out of their orbital planes so that their leading edges are again in raised positions.

The hub assembly 3b of FIG. 3, otherwise identical with those of FIGS. 1 and 2, has lugs 5b', 5b" slope downwardly in a radially outward direction so that the blades 8' and 8", fulcrumed to these lugs at 6b' and 6b", sweep two essentially conical orbits.

It will be understood that the various lug positions and blade shapes shown in FIGS. 1–3 are merely illustrative of a variety of arrangements designed to suit specific requirements and that modifications and combinations of the features shown are readily possible.

In FIGS. 4 and 5 I have illustrated a modified receptacle 101 whose bottom wall is formed by an insert 102 forming an upwardly open, generally toroidal channel 103. Insert 102 is mounted on a central vertical shaft 104 which is adapted to be driven, as indicated by arrow 105, at relatively slow speed by a motor not shown. A boss 106, extending horizontally inwardly from the wall of receptacle 101, carries a horizontal shaft 10 which is driven at relatively high speed from the same or another motor and fulfills the role of shaft 2 in the preceding embodiments. Shaft 10, accordingly, has mounted thereon a hub assembly 3c which is generally similar to those described in connection with FIGS. 1–3, except that two straight lugs 5c are both provided on the ring 14 while the spacer ring 15 has been omitted. Blades 99 are swingable about respective pins 6c which define pivotal axes parallel to the axis of shaft 10. It will be noted that the axis of this shaft, apart from being skew to the axis of central shaft 104, lies in a plane tangent to the circular center line of the toroidal chanel 103. As the insert 102 rotates about its vertical axis, the tips of the blades 9 sweep more or less close to its concave surface 103 while rotating in a radial plane of shaft 104. Naturally, the blades 9 shown in FIGS. 4 and 5 may be replaced by any of the blades shown in the preceding embodiments and their mounting lugs may also be modified as discussed above.

It will be evident that, for cleaning purposes, the boss 106 supporting the hub assembly 3c and the shaft 10 may be made removable to facilitate extraction of the likewise removable insert 102 with its shaft 104.

The embodiments described and illustrated may, of course, be modified in various ways readily apparent to persons skilled in the art without departing from the spirit and scope of the invention as defined in the appended claims.

I claim:

1. A blender comprising a receptacle with side and bottom walls, a rotatable shaft in said receptacle, hub means on said shaft above the bottom wall of said receptacle, pivot means on said hub means offset from the axis of said shaft, and blade means freely fulcrumed on said pivot means for rotary entrainment by said shaft in an orbit of sweep approaching at least one of said walls in a fully extended position of said blade means in which said blade means extend in substantially radial direction away from the shaft axis, the latter being swingable about said pivot means in a sense opposite the shaft rotation for sweeping an orbit of lesser radius in response to resistance from a mass of material to be processed in said receptacle.

2. A blender comprising a receptacle with side and bottom walls, a rotatable shaft in said receptacle, a hub on said shaft above the bottom wall of said receptacle, a plurality of pivotal points angularly spaced on said hub with pivotal axes offset from the axis of said shaft, and a plurality of blades respectively freely fulcrumed on said hub by said pivotal joints for rotary entrainment by said shaft in orbits of sweep approaching at least one of said walls in a fully extended position of said blades in which each of said blades extends in substantially radial direction away from the shaft axis, the latter being swingable about their respective pivotal axes in a sense opposite the shaft rotation for sweeping orbits of lesser radius in response to resistance from a mass of material to be processed in said receptacle.

3. A blender as defined in claim 2 wherein said pivotal axes are inclined at a small angle to the shaft axis.

4. A blender as defined in claim 2 wherein said blades are twisted out of their orbital planes.

5. A blender as defined in claim 3 wherein said blades are relatively staggered in axial direction of said shaft.

6. A blender as defined in claim 2 wherein said bottom wall is formed with an upwardly open generally toroidal channel centered on a vertical axis, said shaft extending substantially horizontally and skew to said vertical axis in a plane tangent to the center line of said channel, the tips of said blade orbiting close to the channel surface in their extended position, said shaft and said bottom wall being mounted for relative rotation about said vertical axis.

7. A blender as defined in claim 6 wherein said shaft is fixedly journaled on said receptacle, said bottom wall being constituted by a rotatable insert in said receptacle.

8. A blender as defined in claim 7 wherein said insert is provided with a drive spindle passing centrally out of said receptacle.

9. A blender comprising a generally cup-shaped receptacle with a peripheral wall and a bottom wall, a rotatable shaft rising centrally from said bottom wall, a hub on said shaft above said bottom wall, a plurality of pivotal joints angularly spaced on said hub with pivotal axes offset from the axis of said shaft, and a plurality of blades respectively freely fulcrumed on said hub by said pivotal joints for rotary entrainment by said shaft in orbits of sweep approaching at least said peripheral wall in a fully extended position of said blades in which each of said blades extends in substantially radial direction away from the shaft axis, said blades being swingable about their respective pivotal axes in a sense opposite the shaft rotation for sweeping orbits of lesser radius in response to resistance from a mass of material to be processed in said receptacle.

10. A blender as defined in claim 9 wherein said blades have leading edges raised with reference to associated trailing edges.

11. A blender comprising, in combination, a receptacle having a side wall and a bottom wall; a rotatable vertical shaft in said receptacle; at least one pivot pin connected to said shaft spaced from and inclined at a small angle askew to the shaft axis and having a leading end at a lower elevation than the trailing end thereof; and an elongated blender member mounted adjacent one end thereof on said pivot pin freely turnable about the axis of the latter to move upon rotation of said shaft under the influence of centrifugal forces to an extended position extending substantially radially away from the shaft axis and to tilt from said extended position downwardly and rearwardly in direction opposite to the shaft rotation in response to resistance of a mass of material to be processed in said receptacle.

12. A blender comprising, in combination, a receptacle having a side wall and a bottom wall; a rotatable vertical shaft in said receptacle; at least one pivot pin connected to said shaft spaced from and inclined at a small angle askew to the shaft axis and having a leading end at a lower elevation than the trailing end thereof; and an elongated blade extending substantially normal to the axis of said pivot pin with the leading edge of said blade at an elevation higher than the trailing edge thereof, said blade being mounted adjacent one end thereof on said pivot pin freely turnable about the axis of the latter to move upon rotation of said shaft under the influence of centrifugal forces to an extended position extending substantially radially away from the shaft axis and to tilt from said extended position downwardly and rearwardly in direction opposite to the shaft rotation in response to resistance of a mass of material to be processed in said receptacle.

13. A blender comprising, in combination, a cup-shaped receptacle having a side wall and a bottom wall; a rotatable vertical shaft in said receptacle; a hub mounted on said shaft for rotation therewith and having a pair of arms extending in opposite direction substantially radially away from the shaft axis and being displaced from each other in axial direction from said shaft; a pivot pin mounted on each arm spaced from and inclined at a small angle askew to the shaft axis and having a leading end at a lower elevation than the trailing end thereof; and an elongated blade for each pivot pin extending substantially normal to the axis thereof with the leading edge of each blade at an elevation higher than the trailing edge thereof, each blade being mounted adjacent one end thereof on the respective pivot pin freely turnable about the axis of the latter to move upon rotation of said shaft under the influence of centrifugal forces to an extended position extending substantially radially away from the shaft axis and to tilt from said extended position downwardly and rearwardly in direction opposite to the shaft rotation in response to resistance of a mass of material to be processed in said receptacle.

References Cited in the file of this patent

UNITED STATES PATENTS

| | | |
|---|---|---|
| 2,744,203 | Collura | May 1, 1956 |
| 2,986,186 | White | May 30, 1961 |